Patented Aug. 6, 1935

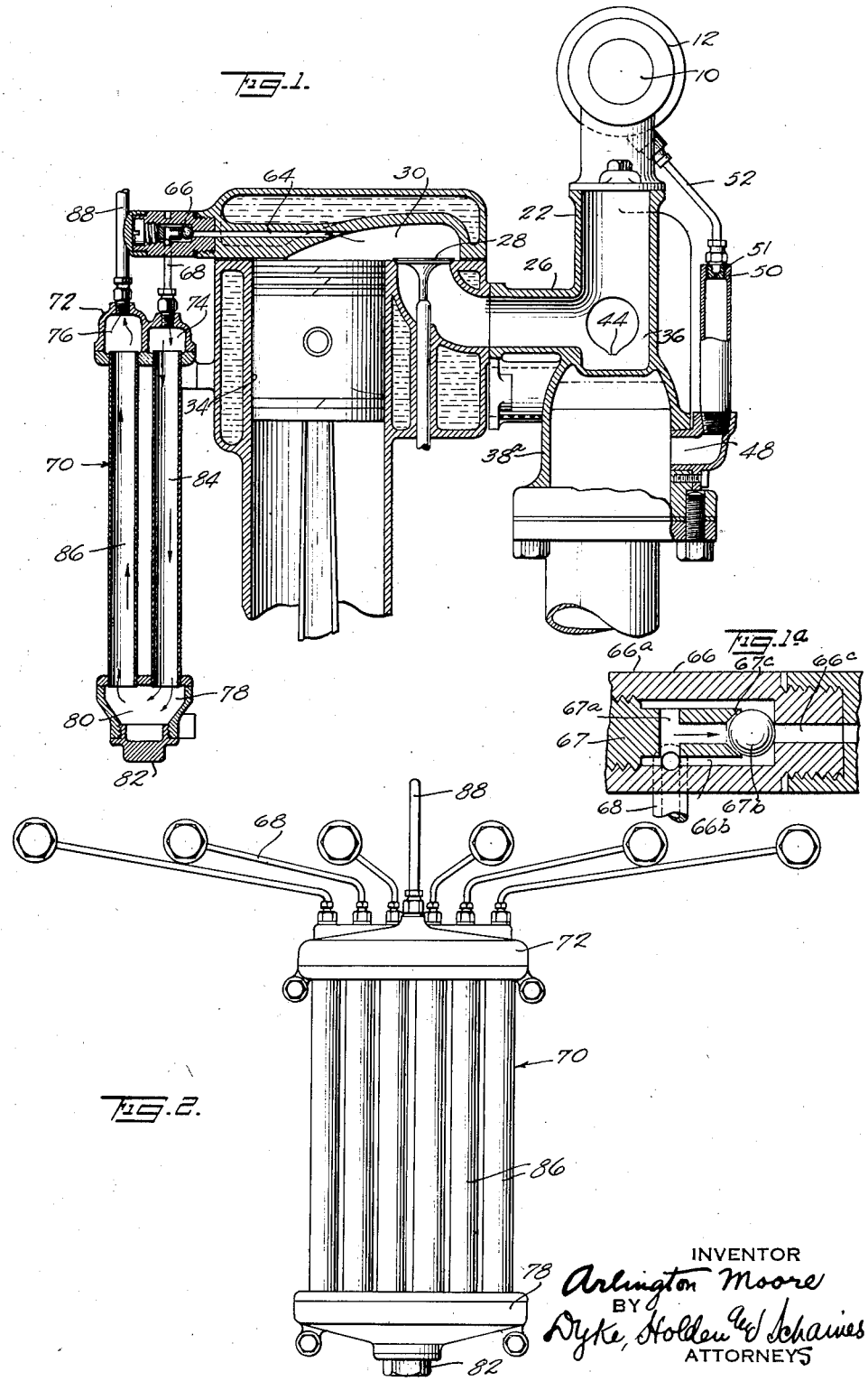

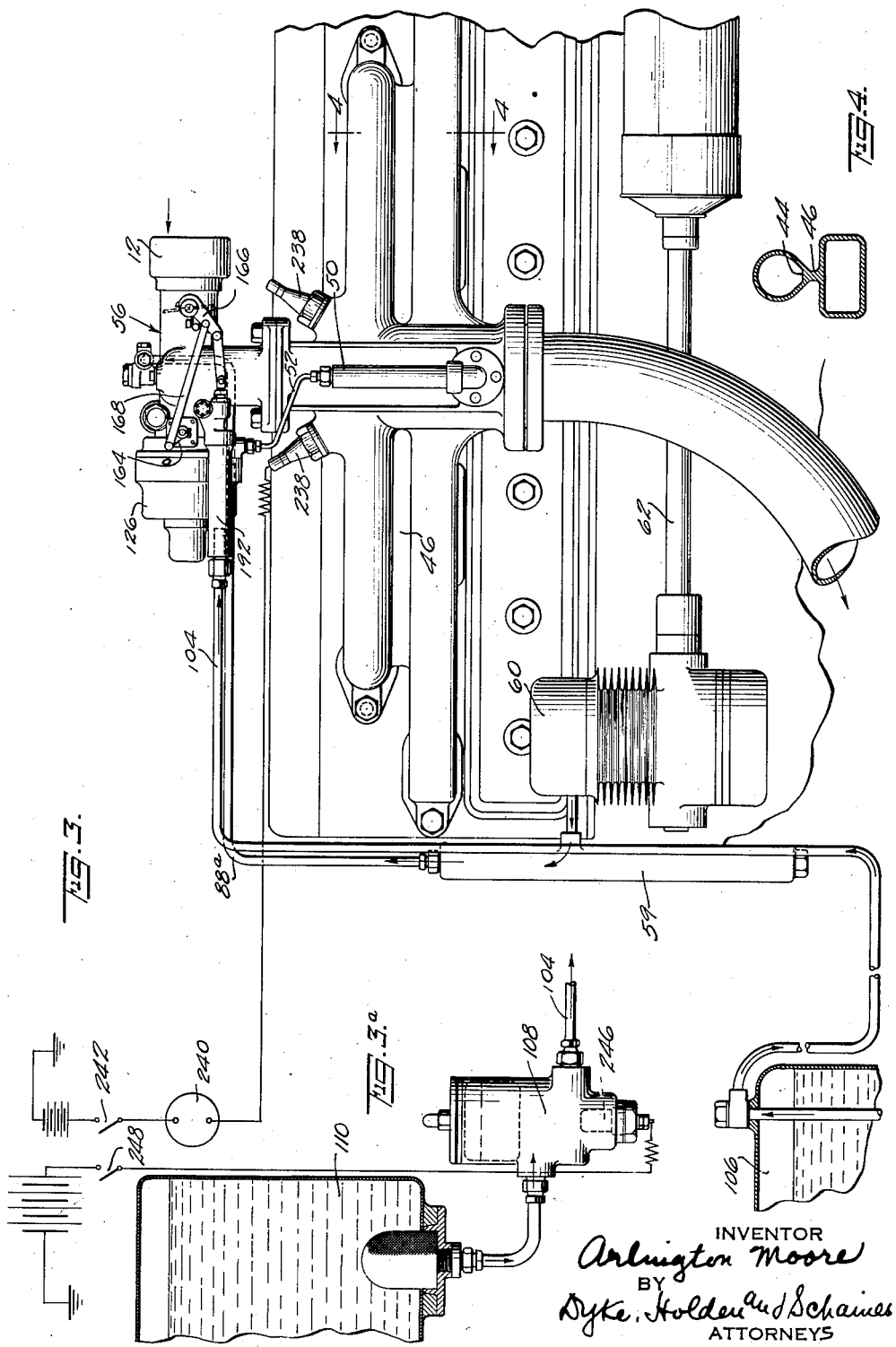

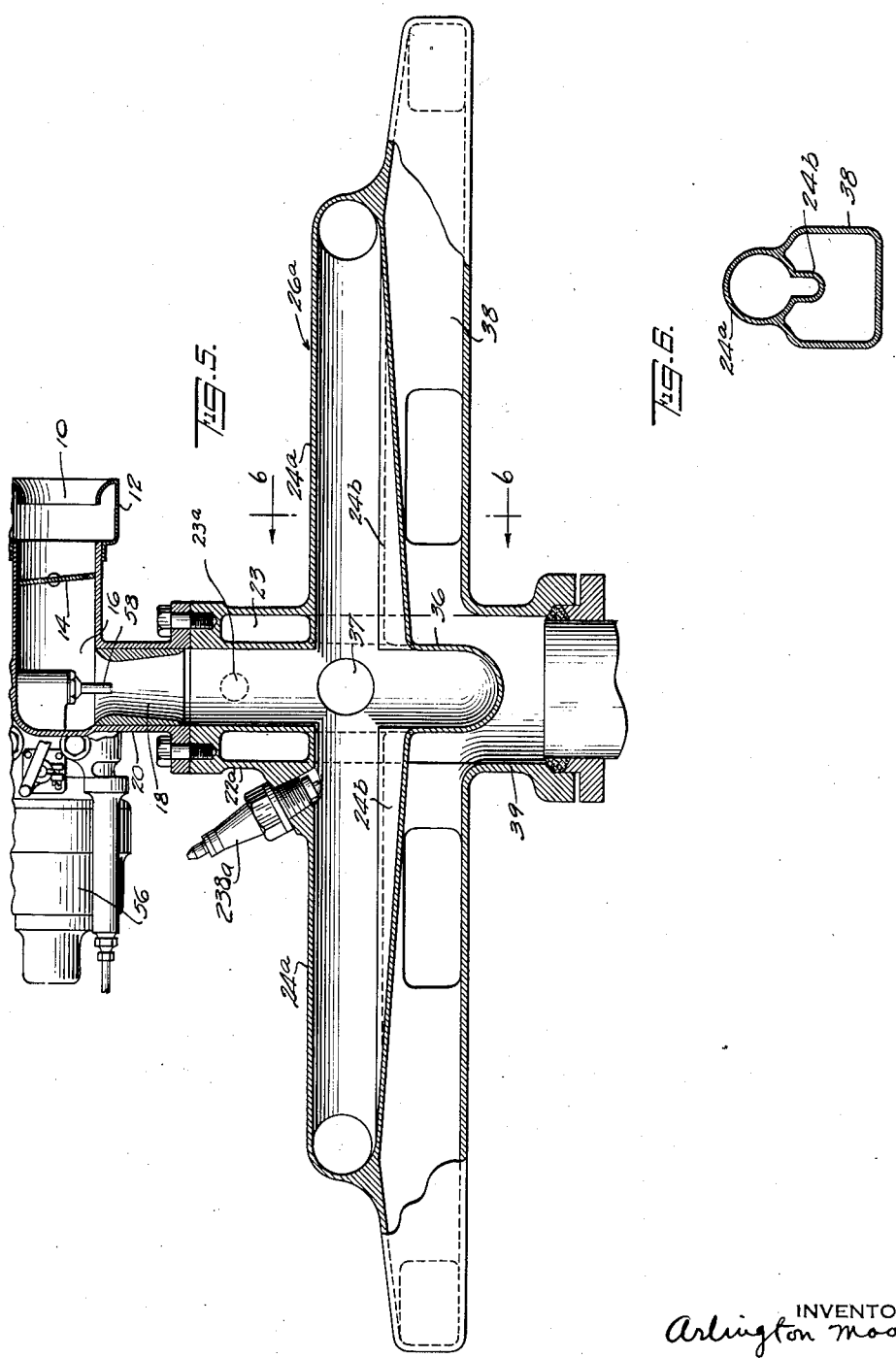

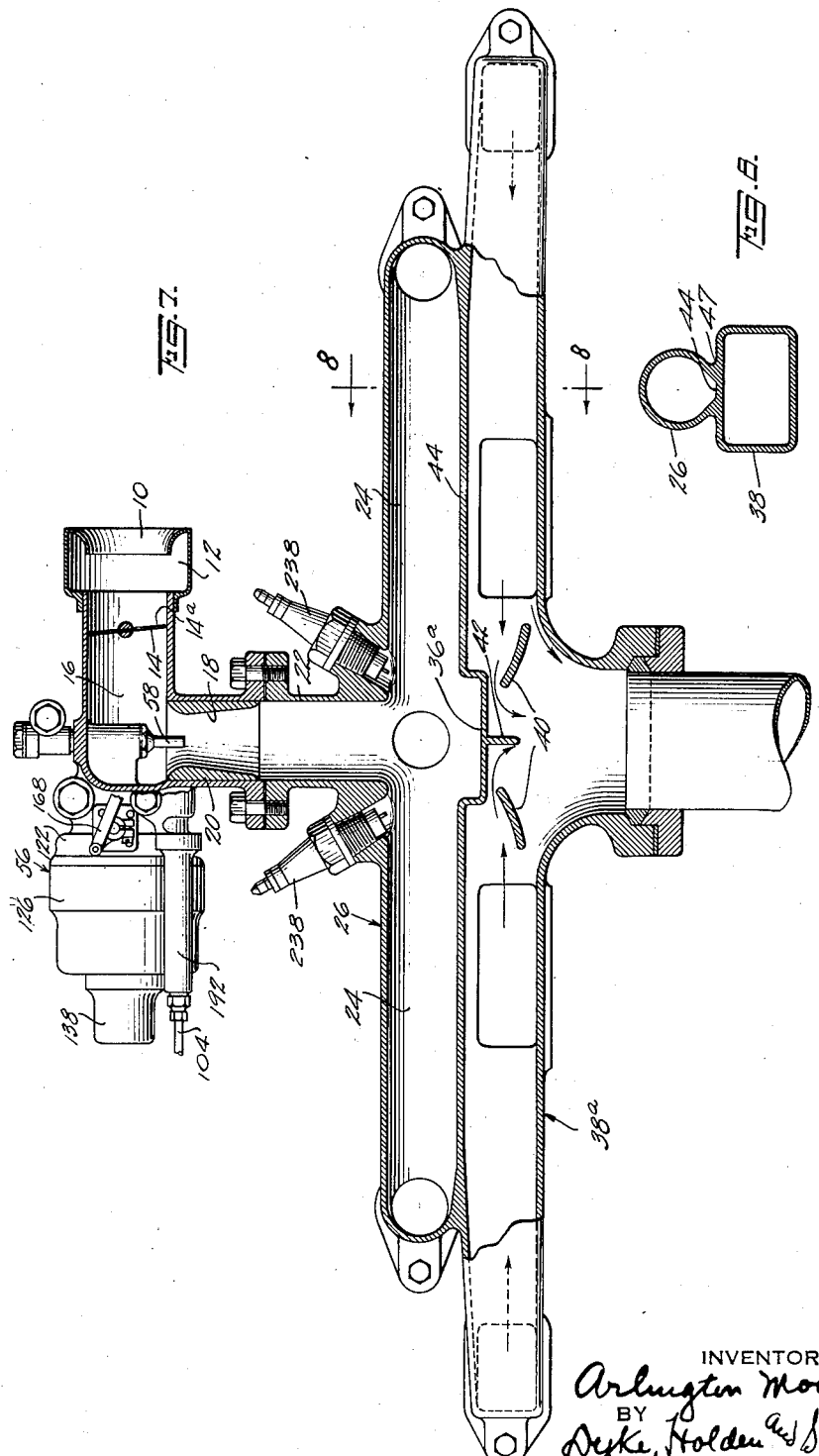

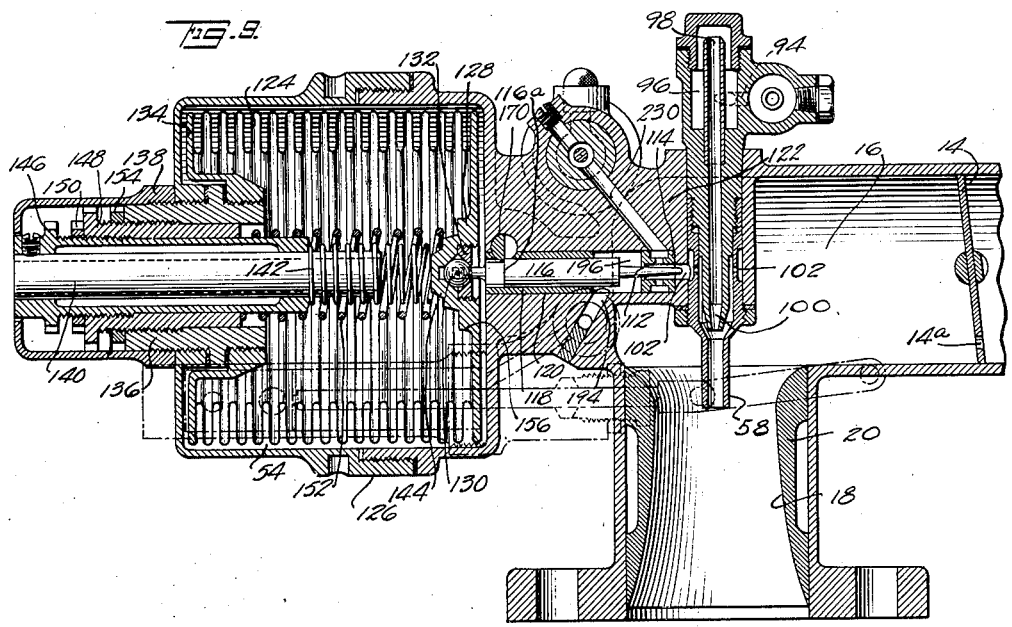
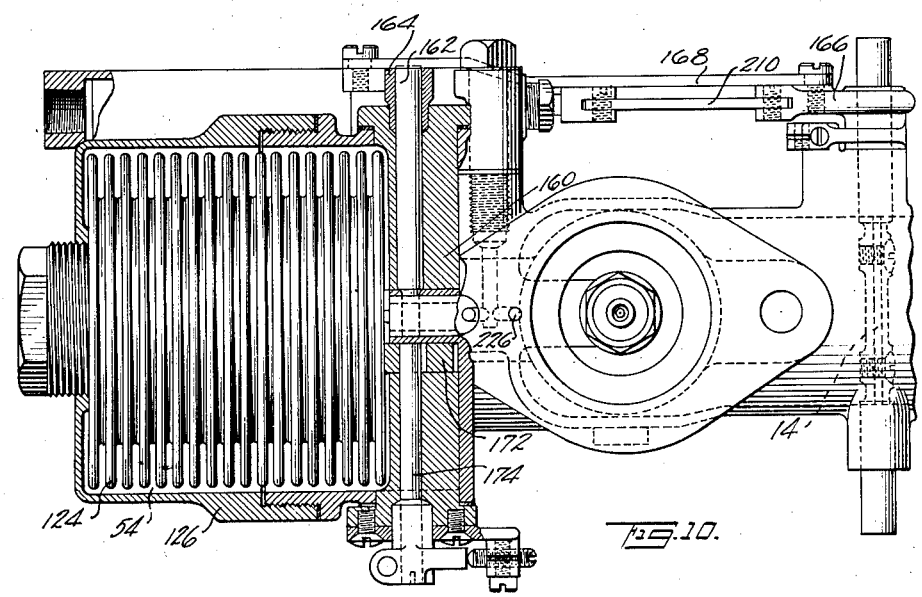
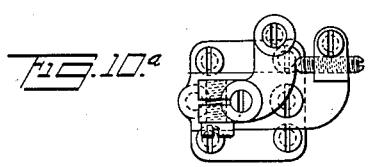

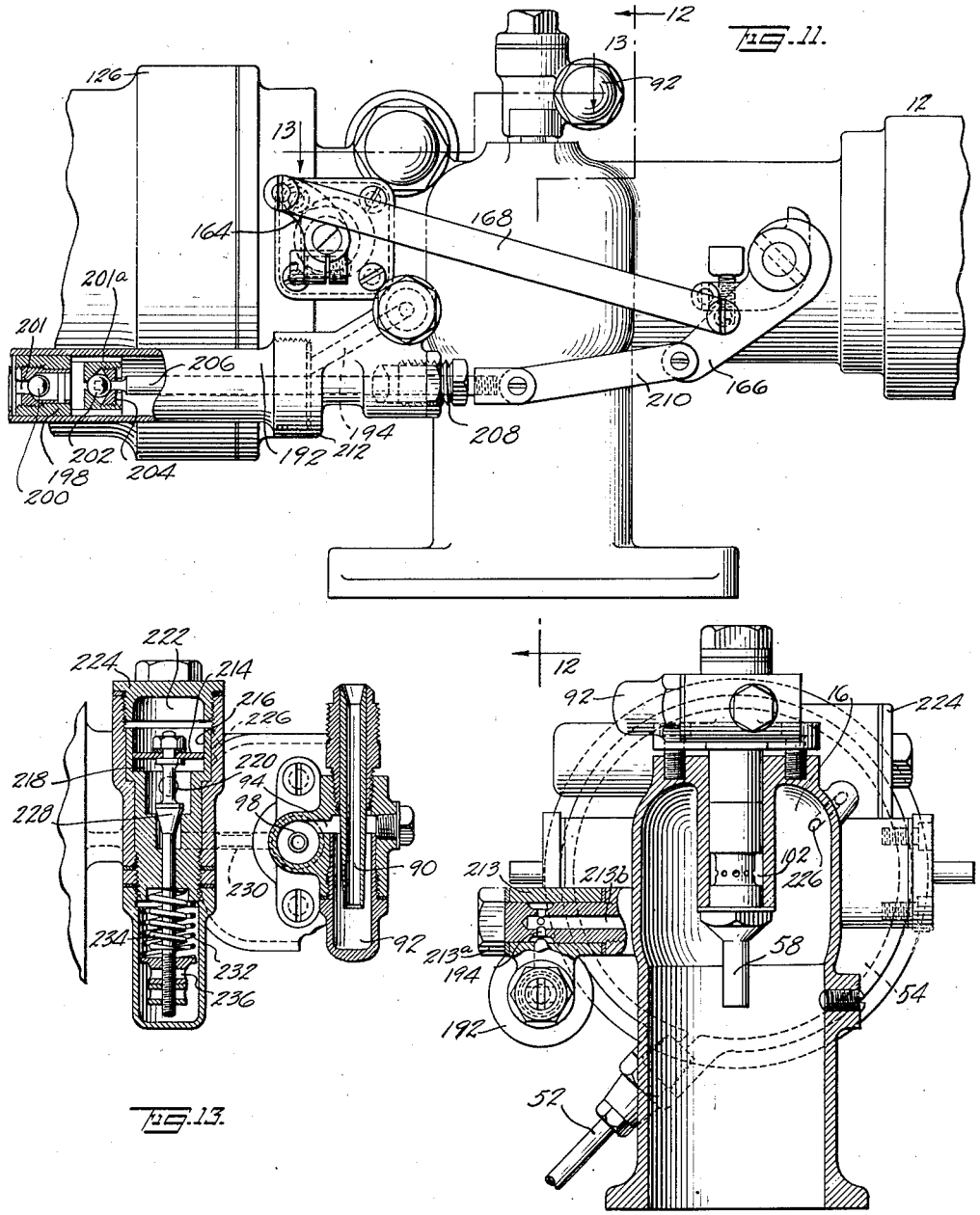

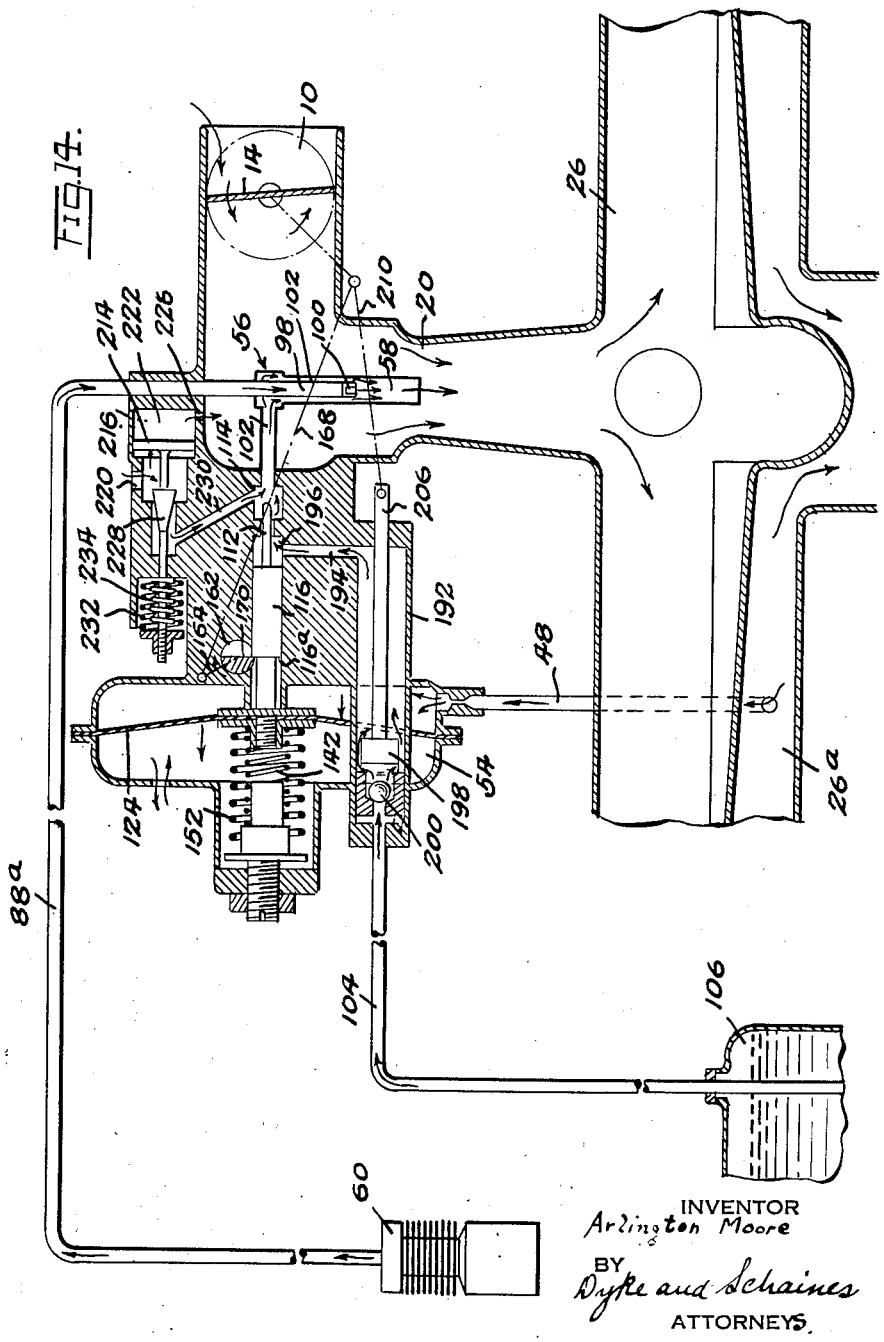

2,010,315

UNITED STATES PATENT OFFICE 2,010,315

PREPARATION AND DISTRIBUTION OF FUEL AND AIR MIXTURES FOR INTERNAL COMBUSTION ENGINES

Arlington Moore, New York, N. Y., assignor, by mesne assignments, to Maxmoor Corporation, New York, N. Y., a corporation of Delaware Application March 11, 1930, Serial No. 434,847

51 Claims. (Cl. 123—131)

My invention relates to the supplying of the air and fuel charge to the cylinders of internal combustion engines through distributing manifolds.

The invention is adapted for utilizing gasoline, or other liquid fuels, or heavier fuels, such, for example, as the grades of oil commonly known as "fuel oil" ranging from 36 to 45 Baumé, more or less.

It is an object of my invention to supply the fuel to engines of the Otto cycle type in suitable state and in accordance with the engine demands of load and speed, whereby to obtain flexibility in operation.

A further object is to effect vaporization of the fuel component by discharge thereof into the air stream subject to the action of vaporizing influences supplementary to that of heating, whereby to produce a substantially dry mixture without unduly affecting the volumetric efficiency.

Another object of the invention is to vaporize the fuel by subjecting the same to the action of a plurality of vaporizing influences resulting from and varying with the engine operation and supplementing each other to insure adequate fuel vaporization as the quantity of fuel introduced varies throughout the range of engine operation.

Another object of the invention is to control the fuel flow by the statical pressure variations of a plurality of mediums in which the pressure differential of one medium becomes more effective in its action as the other becomes weaker, and vice versa.

Another object of the invention is to utilize the advantages obtained from the discharge of the fuel into the air stream in the region of intake depression beyond the air controlling means without the disadvantages thereof, by controlling the fuel flow by and in inverse relation to the variations in intake depression to counteract the effects thereof at the fuel discharge end over the higher portion of the intake depression range, and further controlling the fuel flow by and in direct relation to the variations in pressure of a medium varying in substantially a straight line direction substantially throughout the range of engine operation and substantially in inverse relation to the variations in intake depression at fractional loads.

Another object of the invention is to restrict the fuel passage at low fractional loads adjunctively with the control of the air, whereby to insure the obtaining at engine idling of a minimum fuel passage which is not affected by the action of the pressure variations normally controlling the passage.

Another object of the invention is to supplement the pneumatic agencies in causing fuel flow by mechanically imparting an impetus to the fuel movement upon sudden throttle opening movements to cause the supplying of ample fuel for acceleration.

In the best embodiment of my invention, I utilize each of the steps or procedures outlined below, but, as will readily be understood, not all of such steps or procedures need be followed in every case.

In extremely cold weather initial starting of engines is facilitated by preheating the oil until normal operating temperatures are established.

Air is introduced into the metered fuel, as by control of a bleed inlet passage for atmospheric air by and in direct relation to the variations in intake depression over the fractional load range of engine operation, the passage leading into the fuel line at a point of subatmospheric pressure. The aeration of the fuel by admixture with the limited quantity of air introduced through the air bleed opening serves to facilitate the final vaporization of the fuel when discharged into the main air stream, and the control of the air bleed opening, as described, controls the fuel mixture ratio and the degree of aeration.

The aerated fuel is further broken up mechanically into a fog-like state of fine comminution by blasting with a fluid or gas directly in the air stream before the stream is subdivided by passing into the manifold branches. The pressure of the gases, and hence the intensity of the blast, is preferably varied directly with variations in the speed and/or mean effective pressures of the engine. When compressed air is used for blasting the fuel, the air compressor is preferably operated from the internal combustion engine being fueled and in this way the pressure varied directly with the engine speed, or cylinder gases of the engine may be utilized for supplying the gases for fuel blasting. The latter are preferably supplied uniformly from several of the engine cylinders so that balanced engine operation is obtained, and the gases are delivered in a substantially continuous stream.

The fuel blast discharge is located between the point of air throttling and the engine cylinders where the blasting discharge is not obstructed by the throttle. By discharging the blast of fuel directly into this region where the pressure is subatmospheric and very markedly so particularly when the throttle opening is small, the mechanical break-up of the fuel is very efficiently supplemented and the fuel brought into a very high state of comminution, the heterogeneous fuel components vaporizing at lower temperatures than when under atmospheric pressure. The enhancing of vaporization through the increased aeration and reduced pressure effect at fractional loads is important in securing proper fuel vaporization for smooth engine operation, without unduly heating the charge, because at fractional loads the blasting intensity and heat available is less. Hence, the increased vacuum and aeration compensate for decrease in blasting intensity to prevent the intake passages from becoming loaded with fuel. During substantially full load operation there is less reduction of pressure in the intake manifold and little if any aeration, but good fuel vaporization is secured and maintained, since at full load the blast is most intense and the mechanical comminution of the fuel thereby most effective, the velocity of the traveling air and resulting turbulence is substantially maximum, plenty of exhaust gas heat is available, and the heat of compression is high because of elevated compression pressures.

The blast of fuel is preferably discharged downwardly in the direction of air flow through a portion of the blast charger having a surrounding heating jacket in order to prevent appreciable condensation of fuel at this point.

The nozzle speed at which the blasting gases are discharged exceeds the speed of the incoming air so that the portion of the fuel which is not immediately vaporized overtakes and substantially bores or cuts its way as a distinct stream through the slower traveling air. Thus the fuel, already broken up by the blast, is further broken up by its collision with the air. The blast of fuel from the nozzle extracts heat from the air, this heat causing the vaporization of minute globules of fuel into suspension in the air stream for delivery into the manifold branches. The arrangements are preferably such that substantially the hottest portion of the exhaust gas is concentrated upon a relatively small surface which is located beyond the path of travel of the charge adjacent to the point of subdivision of the air stream and intermediate of and adjacent to the exhaust ports at the junction of the exhaust gas streams and which is struck by the blasted fuel and causes evaporization thereof. Utilization of heat in conjunction with blasting causes effective vaporization of the fuel particles. The heat available is substantially entirely absorbed by the fuel without materially heating the air, resulting in relatively cold and dense charges passing to the cylinders. Heat is also preferably applied to the floor of the intake manifold, where its effect is principally confined to the vaporizing of any condensed fuel collected on the floor in a trough formed therein, and transfer of heat to the air of the charge stream is reduced or avoided.

The size of the manifold passage for distributing the charge to the several cylinders is preferably such as to secure subtantially high velocity of the charge material sufficient to maintain the fuel vapor in admixture with the air and avoid condensation effects which would result from slowing up of the charge. While intake manifolds formed with square turns may be made use of, I preferably avoid resorting to such power-reducing measures for securing turbulence in the manifold, and make the turns to conform with the air stream and to deliver a high weight of charge to the engine cylinders.

To start the engine when fuel oils are used, I heat up the intake manifold system as well as the intake valves and cylinders at the period of engine starting. For this purpose I preferably ignite the blasted mixture electrically in the intake manifold upon turning the engine over with the starting motor, being able to readily ignite fuel oil when blasted and otherwise mechanically comminuted as described. The blasted oil produces an extremely hot flame which surges through and quickly heats up the engine. The flame may be extinguished, as by momentarily closing off the air supply by the throttle, and the engine operated thereafter in the normal manner.

The fuel supply is preferably vented to the atmosphere at its source, and the fuel is lifted from the source of supply and delivered to the fuel nozzle in response to reduction of pressure below atmospheric (partial vacuum) effective on the fuel discharge nozzle.

The extent of opening of the fuel supply passage is regulated, as by a modulating pin, to vary directly with changes in fluid pressure, such as exhaust gas pressure, which itself varies substantially directly with the charge weight to the engine cylinders, the modulating pin being moved in opening direction by a pressure-responsive device actuated by exhaust gas pressure, and working against spring means tending to close off the fuel valve.

The pressure reduction available for producing fuel flow is the resultant of that obtained from three principal sources, namely, air flow, fuel injection by blasting gases, and general intake depression due to the fuel nozzle being located between the point of throttling and the engine cylinders. Pressure reduction due to air flow and that due to blasting injection both vary directly with the fuel requirements and can be made use of directly for effecting fuel flow.

The pressure reduction due to throttling effective on the discharge nozzle in the intake between the throttle and the engine cylinders varies inversely with the fuel requirements, the vacuum in the intake being greatest when the throttle is nearly closed and little fuel is required, and vice versa. Also, if the fuel passage area, at times when the vacuum is high because the throttle opening is small, be constricted to such extent as is necessary to permit only the limited quantity of fuel required at such times to pass in response to the high vacuum present, frictional retardations to fuel flow and fluctuations thereof would be set up and would interfere with getting desirably smooth engine operation.

During the periods when pressure reduction in the intake is principally due to throttling, I reduce the effect thereof to produce fuel flow by introducing primary air into the fuel supply line or conduit just after the fuel passes the metering valve, and vary this air bleed substantially directly (and therefore the fuel supply substantially inversely) with the pressure reduction in the engine intake; that is to say, with a relatively high vacuum in the intake the air bleed opening is greatest, so that most air is bled and relatively least fuel is passed, and with lowered vacuum in the engine intake the air bleed opening is reduced with consequent relative increase in fuel supplied. I preferably limit the air bleeding action so that it does not take place when the intake depression is less than that required to lift the fuel at low speeds, i. e., about 2″ Hg, where the fuel is lifted from a relatively low level as herein disclosed.

By admitting the air with the fuel as described, I can have larger fuel valve openings than would otherwise be possible at periods of high intake vacuum without permitting the passage of unduly large quantities of fuel which would otherwise be fed in response to the high vacuum, and the engine operation is free from objectionable pulsation or unevenness. The extent of air bleed opening is, however, held within such limits as at no time to reduce the pressure difference effective upon the fuel below that required for lifting the fuel from the source of supply. As already pointed out, the bled air helps to break up the fuel and promotes high economy of operation.

I preferably deliver the fuel through a throttle-actuated fuel pump so arranged that, while during ordinary operation the fuel passes unobstructed through the pump, upon quickly opening the throttle for supplying additional air for increasing the weight of charge of the engine cylinders (accelerating) an additional supply of fuel is simultaneously obtained through the action of the pump, and inertia lag of fuel upon increasing the throttle opening for accelerating is avoided. Such pump is also useful in other ways. For example, I can fill the fuel line and insure adequate fuel supply for starting by a few quick strokes of the throttle-actuated pump.

The accompanying drawings show illustrative forms of apparatus by which my invention may be carried out, but it is to be understood that same are illustrative only and not for limitation of the invention which is of the scope defined in my claims.

In said drawings:

Figure 1 is a transverse, partial sectional view of apparatus in accordance with my invention, using cylinder gases for fuel blasting, the sections being taken through the fueling apparatus, and an engine cylinder, and the separator for cylinder gases;

Fig. 1ª is an enlarged section of a pressure element shown in Fig. 1;

Fig. 2 is a side view of the separator shown in section at Fig. 1;

Fig. 3 is a side elevational view showing a modified form in which the fuel is blasted by air from an air compressor driven off the engine;

Fig. 3ª is an elevation, partly in section, showing a constant level fuel supplying arrangement;

Fig. 4 is a detail section on line 4—4, Fig. 3;

Fig. 5 is a longitudinal sectional view of a manifold system;

Fig. 6 is a detail section on line 6—6, Fig. 5;

Fig. 7 is a longitudinal sectional view of a modified form of manifold system;

Fig. 8 is a detail section on line 8—8, Fig. 7;

Fig. 9 is a vertical and Fig. 10 a part bottom plan and part horizontal sectional view of the charge forming device;

Fig. 10ª is an elevation of a detail shown at Fig. 10;

Fig. 11 is an enlarged view of the blast charger with a part in section;

Fig. 12 is a section taken on approximately the broken line 12—12, Fig. 11, the Venturi tube being omitted; and Fig. 13 is a detail section on approximately lines 13—13, Fig. 11.

Air admitted at 10, Figs. 1 and 7, passes through the silencer 12, past the throttle 14 provided with air bleed 14ª, through the elbow part 16, downward through the passage 18 in Venturi member 20, and through descender (antonym for riser) 22, through the branches 24 of the intake manifold 26, and past the intake valves 28 to the combustion chambers 30 over the piston 32 of cylinder 34.

As illustrated at Fig. 5, the descender 22ª is provided with an annular exhaust gas jacket or chamber 23 communicating with the exhaust manifold for heating the wall of the descender to prevent condensation of the fuel thereon, the jacket being provided with a port 23ª for the escape of the exhaust gas into the atmosphere. The heating effect is principally confined to vaporizing the fuel, and such heating effect as there is on the air in this region is counteracted by the refrigerating effect of fuel vaporization at and near the point of blasting into a region of reduced pressure.

The manifold 26ª is preferably of the type disclosed and claimed in my copending application Serial No. 234,417, filed November 19, 1927, in which the manifold branches 24ª are provided at the lower side thereof with channels 24ᵇ inclined to drain fuel downwardly towards the center of the manifold and decreasing in cross-section towards the outer ends, forming with the remaining portion of the branches 24ª passages having enlarged entrances compared to the outlet ports and progressively decreasing in cross-section towards the ends for maintaining ample charge velocity. Opposite the end of the descender 22ª intermediate the inner ends of the channels or troughs 24ᵇ the intake manifold is locally depressed to form a relatively deep open bowl or crucible 36 aligned with the descender 22ª and of substantially the same diameter and facing the blast nozzle, the bowl being located appreciably below the central port or branch 37 from the manifold 26ª. Heat of the exhaust gas is concentrated on the outer side of the bowl 36 as by casting the exhaust manifold 38 integral with the intake manifold 26ª. The bowl 36 is located in or projects into the manifold 38 at the point thereof where the hot gases are deflected into the common outlet 39 for the branches thereof, and is therefore subject to the exhaust gas at the hottest point thereof. As shown at Fig. 6, the troughs 24ᵇ also project into the exhaust manifold to be heated by the exhaust gas therein, and any liquid present and collecting in these troughs is heated and vaporized or returned to the crucible 36 to be evaporated.

The hot bulb or crucible 36 effects efficient vaporization of the particles of fuel which are caused to impinge thereon by discharge from the blast nozzle and prevents splashing of fuel into the central port or branch 37 of the intake manifold, insuring thorough and uniform vaporization productive of good mixture ratio and uniform distribution. My system of blasing the fuel in a comminuted condition into the air stream tends, by absorption of heat from the air by the blasted fuel, to actually reduce the temperature of the air even in the presence of the exhaust gas heating. Further, the heat absorbed by the fuel from the exhaust gas in the manner described reduce back pressure in the exhaust gas conduit, resulting in better cylinder scavenging.

Opposite the end of descender 22 of the form of manifold 26 illustrated at Figs. 1, 7 and 8, the floor of the intake manifold is locally depressed to form a thin walled cavity or dished portion 36ª located at the branching point of intake manifold 26. Heat of the exhaust is concentrated on this thin-walled part 36ª, as by casting the exhaust manifold 38ª integral with the intake manifold 26, and providing the former with septa 40 and web 42 so disposed as to cause the principal part of the hot exhaust gas to impinge on the under side of said wall portion 36ª, without materially retarding the discharge of the exhaust gases from the exhaust manifold. The section of the intake manifold branches 24 is preferably such as to provide the bottom troughs or grooves 44, and any liquid present and collecting in these grooves 44 is heated and vaporized by heat from the exhaust gas manifold 38ª conducted either through the fin 46 (Fig. 4), connecting the two cast-together manifolds, or through a close-up formation of intake and exhaust manifolds as shown at 47, Figs. 7 and 8, depending on the heat required.

A pressure line 48 (Figs. 1 and 3) communicates with the exhaust manifold preferably at a point where the statical pressure therein is at maximum. The statical pressure variations are transmitted through a pressure equalizing pipe 50 of relatively large diameter, small hole 51 and tube 52 of reduced diameter compared to pipe 50 to the pressure chamber 54 for controlling the passage of fuel as described hereinafter. The small hole 51 tends to steady out any pressure fluctuations.

The charge forming device, preferably termed "blast charger" is indicated generally by reference character 56, and functions to deliver a high-speed blast of gaseous fluid and finely comminuted fuel from nozzle 58 downwardly toward the heated cup 36 or 36ª through the Venturi passage 18 in which the discharge end of nozzle 58 is located and through descender 22 or 22ª. The downblast is a much better arrangement than an upwardly directed blast since gravity aids in the discharge of the fuel stream against the hot surfaces for causing complete vaporization, and any flow on the passage walls is in the same direction as the flow of the main charge stream.

The gaseous fluid used for blasting the fuel can be supplied from any source varying directly with the rate of charge supply to the engine. Thus this gaseous fluid may be air, for example, supplied through the equalizing chamber 59 from the air compressor 60 (Fig. 3), driven off the engine being fueled, as through generator shaft 62; or cylinder gases from the engine combustion chambers 30 may be supplied through passages 64 (Figs. 1, 1ª and 2) through pressure elements 66 and through tubes 68 leading to a cooler and separator 70.

The pressure element 66 comprises a member 66ª having an enlarged chamber 66ᵇ therein and a reduced passage 66ᶜ in communication with the passage 64. One end of the chamber 66ᵇ is closed by a threaded plug 67 having an end portion disposed in spaced relation to the wall of the chamber 66ᵇ to form an annular passage for the cylinder gases escaping through pipe 68. The plug 67 is provided with open ended T-shaped passage 67ª in part extending axially thereof and in part transversely. A check ball 67ᵇ is disposed in the chamber 66ᵇ between the end of the plug 67 and passage 66ᶜ, the plug 67 serving to adjustably limit the movement of the ball 67ᵇ and to retain the same centered by means of the recess 67ᶜ in the annular end thereof.

The cross-sectional area of the passage 67ª is made as great as or slightly greater than the cross-sectional area of the passage 66ᶜ so that the back pressure in the passage 67ª closes the passage 66ᶜ when the pressure in the cylinder falls below a predetermined value. The ball 67ᵇ preferably has a diameter in excess of the extent of movement thereof and hence is always retained by the recess 67ᶜ from dropping down.

By the above described arrangement the ball 67ᵇ is always closed when the pressure in the by-pass to the cooler 70 or in passage 67ª exceeds the pressure in the cylinder. This means that the valve 67ᵇ opens subtantially only during the power stroke, the discharge line for the cylinder gases being regulated or designed to maintain a back pressure in the line approaching the maximum and insuring operation of the valve 67ᵇ as above described to avoid loss of mean effective pressure in the cylinders. The ball is caused to seat by the back pressure without being held open by a back pressure of greater effectiveness acting on the cylinder side of the ball. By confining the ball 67ᵇ to limited travel compared to its diameter the ball is kept in periodic or vibratory movement and is effective indefinitely without danger of the valve seat becoming clogged or of the valve sticking. Losses of compression pressure resulting in losses in power and dilution of the incoming charge on the suction stroke by the return of cylinder gases to the cylinder are therefore prevented.

The cooler 70 preferably comprises an upper cast header 72 having an entrance chamber 74 and a separate exit chamber 76, to the former of which tubes 68 are connected, and a lower cast header 78 containing the single chamber 80 and bottom cleanout plug 82. The flow of gases is first downward through a set of tubes 84 connecting entrance chamber 74 to chamber 80, and from chamber 80 upward through a set of tubes 86 to exit chamber 76. In such passage the gases are cooled and foreign materials deposited which can be removed occasionally by opening plug 82.

The gaseous fluid from the cylinders is delivered to the blast charger 56 through the supply tube 88, or through tube 88ª when compressed air is employed as at Fig. 3, tube 88 terminating in a nozzle 90 (Figs. 9, 11, 12 and 13) opposite the entrance of the cleanout cup 92 which like plug 82, can be unscrewed occasionally for permitting removal of any lodged foreign material.

The gaseous fluid after passing back out through the mouth of cup member 92 (the consequent reversal of movement favoring the elimination of any foreign material) is delivered through passage 94 to a second clean-out chamber 96, then upwardly around tube 98 and, again reversing direction, down through the bore of tube 98, and is discharged through the jet opening 100 disposed in nozzle 58 and serves to break up and powerfully inject and blast the fuel supplied through the surrounding fuel passage 102, and to deliver the resulting finely divided fog-like mixture from nozzle 58 as already described.

The fuel supply is through tube 104 which may be fed from the bottom of a low down top-vented tank such as a rear-end automobile tank 106, or it may be fed as shown at Fig. 3ª from a float-controlled constant-level chamber 108 supplied by gravity from an elevated tank, such as the dash fuel tank 110 of a motor truck. In either case, the source of supply is below the fuel passage 102.

The valve for metering the flow of fuel into passage 102 preferably consists of a longitudinally movable taper pin 112 (Figs. 9 and 10) coacting with a circular opening in member 114 to form an annular fuel passage therebetween.

The preferably enlarged stem 116 of valve 112 has a close sliding fit in a bushing 118 fitted in bore 120 of the principal casting 122 of the blast charger, and is operated from a pressure responsive device here shown as a bellows 124 closely fitting in the pressure chamber 54 formed partly in casting 122 and partly in the screw cap member 126. By reducing the clearance between bellows 124 and the chamber walls to substantially a minimum, quick response of the bellows is obtained to exhaust gas pressure variations transmitted through the air trapped in pipe 50. Connection of the valve stem 116 to the head 128 of bellows 124 can be made by a ball head 130 and ring nut 132. The opposite head 134 of bellows 124 is secured to the cap member 126 by a screw thimble 136, which may be locked by screw cap 138.

The arrangement of parts for admitting air at atmospheric pressure to the interior of bellows 124, and for adjustably spring opposing the contraction of the bellows caused by exhaust gas pressure, comprises a central tube 140, the inner end whereof serves as a guide for the light inner spring 142, which is centered at its opposite end by the boss 144 of bellows 128, and is adjusted by screwing thimble 146 in or out of the surrounding thimble 148 and locking with lock nut 150; and thimble 148 serves to adjust the tension of the heavier outer spring 152 by being screwed into or out of sleeve 136 and locked with a lock nut 154. An initial clearance is left between spring 152 and shoulder 156 of bellows head 128 to be engaged thereby. With the described arrangement, contracting movement of bellows 124 adapted for increasing the opening of valve pin 112 is opposed at first by light spring 142, and later further opening is opposed by both springs 142 and 152, either or both of which may be adjusted as desired.

A shaft 162 adapted to make an airtight seal in casting 122 has a crank 164 on its outer end operated from the throttle arm 166 through link 168. The inner end of shaft 162 has a semi-circular portion 170 the flat face whereof engages the shoulder 116a on stem 116 of the fuel pin 112 and serves to positively move the pin to position for idling as the throttle closes and to hold said pin steady at its position of least opening during idling position. It is desirable to avoid using spring 142 for this purpose and to adjust said spring 142 so that it will yield readily to exhaust gas pressure in order to provide fuel increase along with air increase upon the initial opening of the throttle. Also the exhaust pressure is inconsiderable at idling and not without liability to noticeable fluctuation so that a mechanical holding means for the fuel metering pin at idling is useful from this standpoint. If so desired, the bellows 124 may be slightly stretched by the movement of pin 112 to idling position so that upon opening of the throttle the release of the pin by portion 170 causes the bellows to contract slightly to impart opening movement to the metering pin 112 before the exhaust gas pressure acts appreciably against the tension of spring 142.

A cam 172 at the inner end of a shaft 174 is provided for manually adjusting the extent of fuel passage opening at idling, thereby determining the minimum opening of the fuel valve for idling fuel. When the throttle is opened from idling the tension upon the bellows is released, thus insuring additional fuel and obviating flat spots off of the idling position. The fuel supply is further increased simultaneously because of closing movement of the air bleed. The minimum fuel orifice is obtained positively and mechanically to provide a safeguard against loading of the intake with fuel at idling and against overenrichment during engine deceleration.

The acceleration fuel pump comprises a cylinder 192 (Figs. 9, 11 and 12) to the supply end whereof is connected the fuel supply tube 104, and from the opposite, exit, end whereof the fuel duct 194 connected with and delivers fuel to fuel chamber 196, containing the fuel metering pin 112.

The fuel pump piston 198 contains a ball check 200 and is apertured at 201 for fuel passage therethrough and through passage 201a except when the ball check is seated (as shown in Fig. 11) as a result of a quick movement of piston 198. The piston 198 has secured thereto by the ball head 202 and ring nut 204 the connecting rod 206 which extends through the gland 208 and is actuated from throttle arm 166 through the link 210. The barrel or cylinder 192 of the pump is here shown as screwed into a socket 212 integral with the bracket member 213 secured to the main casting by a bolt 213a threaded into the casting and containing the fuel supply duct 213b aligned with the fuel duct 194 in the casting.

The provision shown for introducing or bleeding air with the fuel comprises a piston 214 (Figs. 9, 12 and 13) working in a barrel 216 having the chamber 218 therein at one side of piston 214 vented to the atmosphere at 220 and the chamber 222 at the other side of the piston closed by cap 224 and communicating with the sub-atmospheric region beyond the throttle 14, by duct 226 extending through the wall of elbow 16.

The pressure difference on the two sides of piston 214 tends to open the air bleed valve 228 and permit of passage of air from vent opening 220 past valve 228, through duct 230 and into fuel passages 102, whence the fuel, aerated with bled air, is delivered to and blasted by gaseous fluid from nozzle 100 out through nozzle 58.

The effect of intake depression exerted to move piston 214 in a direction to open air bleed valve 228 is opposed first by the light spring 232 and later by both spring 232 and the heavier inner spring 234. The spring tension is adjusted by nuts 236, the adjustment being preferably such as to hold the air bleed valve closed when the intake depression is less than about 2" Hg, i. e. the depression required to lift the necessary fuel at low speeds, and thereafter, as the intake depression increases, to open the air bleed valve correspondingly and by reduction of the variable pressure differential on the metering orifice at 112, to reduce the rate of fuel feeding.

Upon starting, the fuel blasted into the intake is ignited as by one or more spark plugs 238 or 238a located on one or both sides of the descender 22 or 22a. A high tension vibrating coil 240 and a switch 242 may be provided for this purpose, and the second plug 238 may be used as a spare or for dual ignition, as may be desired, ignition connections for but one plug being shown for illustration.

When fuel is preheated this may be done in many ways and from various sources of heat, as electricity, exhaust gas, etc. For illustration, I have indicated an electrical heater 246 in the constant level fuel supply chamber 108, with its separate switch 248 between the same and a source of current.

Briefly recapitulating, the fuel metered in response to fuel requirements by a metering appliance adapted to vary the fuel passage area directly with rate of charge supply, is preliminarily aerated by air bled into admixture therewith during the travel of the fuel to the blasting nozzle. This fuel is injected and driven at high speed by the highly compressed air or other gaseous fluid, and is so extensively comminuted as to have principally the form of a fog or smoke, and the mechanical break-up obtained by discharge in this manner from the nozzle is supplemented by friction with the air which, although itself traveling rapidly and in the same direction, is penetrated or cut through by the blast from the nozzle traveling at much higher speeds. Such particles of the fuel as persist so far, without being vaporized and passing on with or through the air towards the engine cylinders, are impelled against a hot surface whereby they are flashed into a vaporous state and by their evaporation here and at other points enroute absorb a large proportion of the heat from this surface and from the air, so that the air of the charge passing through the manifold is not only not reduced in density by absorption of heat but in fact is somewhat increased in density as it enters the branches because of the cooling effect of the vaporization.

With increase of intake depression beyond about 2" Hg the fuel supplied is in part replaced by the bled air so that the effect of intake depression at the discharge end of the fuel line in increasing fuel flow is counteracted by causing the flow to be varied not only directly with variation in exhaust gas pressure, in air flow, and in blasting intensity, but also inversely with intake depression itself acting to control the air bleed, the four fuel varying factors thus acting together to cause the fuel supply to vary directly with the air supply.

A substantially self-compensating relation exists between the several factors for causing the vaporizing of the fuel under different conditions of engine operation. At low fractional loads with the throttle nearly closed, the region of reduced pressure in the intake manifold into which the fuel is directly discharged constitutes a substantial factor in fuel vaporization because the fuel then vaporizes at a lower temperature than at atmospheric pressure. The supplementing of the mechanical comminution and heating of the fuel by aeration with air, and by blasting into the region of reduced pressure most effective at low fractional loads and at idling operation, is of especial importance because of the fact that during such operation the heat of the exhaust gas and the availability thereof for vaporizing purposes is relatively quite limited and the intensity of the gaseous injection is low.

During other conditions of engine operation, and particularly at full load operation, when the intake pressure is high, not only is the mechanical comminution of the fuel by the gaseous blasting thereof of more intense character and at higher pressures of compressed air or cylinder gases, but the temperature of the exhaust gases, and the heat of the flashing area, is much higher, thus compensating for reduction of intake vacuum and of the vaporizing effects due thereto.

The charge mixture comprising the fuel thoroughly vaporized in one or another of the ways that have been described is delivered to the engine cylinders through the intake manifold passages which are desirably such as to maintain sufficient velocity to avoid condensation, while any fuel which does condense and run to the bottom of the manifold is vaporized by contact with the hot floor and the entire charge with the fuel thoroughly vaporized and with the air substantially cool is delivered to the engine cylinders at temperatures and densities well adapted for maintaining good volumetric efficiency.

While practical, it is not necessary to resort to light volatile fuels or additions thereof for starting purposes, inasmuch as heavy fuels, such as fuel oil, are blasted into a state capable of being readily ignited in the manifold even during the coldest weather. Burning of the charge in the manifold for a relatively short interval heats the parts to such a temperature that the charge can be readily ignited in the engine cylinders and normal engine operation taken up.

I claim:

1. The method of supplying and mixing the components of the charge mixture for an internal combustion engine which consists in subjecting the discharge end of the fuel line to the variations in intake depression and to injective action of a fluid varying in intensity as full load operation is approached in inverse relation to the intake depression, and counteracting the direct effects of intake depression at said discharge end by controlling the fuel being supplied by and in inverse relation to the variations in intake depression and by variations of a medium which varies in fuel supplying effectiveness as full load operation is approached substantially in inverse relation to the intake depression.

2. The method of supplying and mixing the components of the charge mixture for an internal combustion engine which consists in subjecting the discharge end of the fuel line to the variations in intake depression, and to the injective action of a fluid and Venturi effect of the air, the two latter varying in intensity as full load operation is approached substantially in inverse relation to the intake depression, and also counteracting the direct effect of intake depression at said discharge end by controlling the fuel being supplied by and in inverse relation to the variations in intake depression and by and directly with the pressure variations of a medium which varies in fuel supplying effectiveness substantially in direct relation to the weight of charge.

3. The method of supplying and mixing the components of the charge mixture for an internal combustion engine which consists in introducing fuel by the action of intake depression into the air passing to the engine cylinders continuously for the speed and load range of the engine, and varying the fuel flow by and in inverse relation to variations in intake depression and by and directly with variations in statical pressure of a gaseous medium which varies in pressure substantially directly with the charge weight.

4. The method of supplying and mixing the components of the charge mixture for an internal combustion engine which consists in introducing fuel into the intake continuously for the speed and load range of the engine subject at the discharge end of the fuel line to pressure reduction in the intake and to the injective action of a stream of gaseous fluid, and varying the fuel flow by and in inverse relation to the variations in intake depression and by and in direct relation to variations in statical pressure of a gaseous medium varying substantially directly with the charge weight.

5. The method of supplying and mixing the components of the charge mixture for an internal combustion engine which consists in conducting fuel into the air stream passing to the engine cylinders continuously for the range of operation of the engine, and varying the fuel flow in direct relation to and by the exhaust gas statical pressure variations and in inverse relation to and by the intake depression.

6. The method of supplying and mixing the components of the charge mixture for an internal combustion engine which consists in varying the fuel flow by and in inverse relation to the variations in intake depression over the operating range of the engine at intake depressions above a predetermined minimum and by and directly with the variations in statical pressure of a medium acting to vary the fuel flow directly with the air supply substantially throughout the operating range of the engine.

7. The method of supplying and mixing the components of the charge mixture for an internal combustion engine which consists in controlling the fuel flow by and in inverse relation to variations in intake depression and by the conjoint effect of the injective action of a gaseous medium and of a medium other than intake depression, both mediums being effective to vary the fuel supply directly with the air supply substantially throughout the operating range of the engine.

8. The method of supplying and mixing the components of the charge mixture for an internal combustion engine which consists in controlling the passage of air to the engine cylinders, delivering bled air and fuel in admixture into the air stream at the region of intake depression while controlling the admission of bled air by and in inverse relation to the variations in intake depression to control the pressure reduction effective in causing fuel flow and while further controlling the fuel supply by another medium varying in fuel supplying effectiveness directly with the air supply.

9. The method of supplying and mixing the components of the charge mixture for an internal combustion engine which consists in controlling the passage of air to the engine cylinders, blasting fuel into the air stream beyond the point of air control by intake depression and injective action of a gaseous fluid varying in inverse relation to intake depression as the control of air is varied, and controlling the fuel being supplied by and in inverse relation to the variations in intake depression over the portion of the range of engine operation characterized by relatively high intake depression and directly with and by exhaust gas pressure variations substantially over the entire range of engine operation.

10. The method of supplying and mixing the components of the charge mixture for an internal combustion engine which consists in subjecting the discharge end of the fuel line to intake depression and thereby causing fuel introduction into the air stream to the engine cylinders continuously throughout the range of engine operation and counteracting the direct effects of intake depression at said discharge end at fractional loads by controlling the fuel flow by and in inverse relation to the variations in intake depression and by and directly with the variations in statical pressure as full load operation is approached of a medium which varies in pressure substantially in inverse relation to the variations in intake depression.

11. The method of supplying and mixing the components of the charge mixture for an internal combustion engine which consists in controlling the passage of air to the engine cylinders, delivering fuel into the air stream in the region of reduced pressure beyond the point of air control, and varying the fuel flow at higher intake depressions only by and in inverse relation to the variations in said pressure reduction and substantially throughout the operating range of the engine by and directly with the variations in pressure of a medium varying in pressure directly with the air supply.

12. The hereindescribed process of preparing charges for internal combustion engines which consists in aerating fuel, blasting the same by fluid injection into the air stream in the region of intake depression, and controlling the fuel flow in part by variation of the aeration directly with and by the variations in intake depression.

13. The hereindescribed process of preparing charges for internal combustion engines which consists in blasting aerated fuel into the air stream in the region of intake depression, and metering the fuel supplied by controlling the aeration in direct relation to and by the variations in intake depression and the fuel passage area directly with and by a medium varying directly with the air supply.

14. The hereindescribed process of supplying and mixing the charge components of an internal combustion engine which consists in varying the fuel flow into the air stream by controlling the fuel passage directly with and by the variations in exhaust gas pressure, and at low fractional loads restricting the fuel passage adjunctively to engine throttling and at idling operation rendering the exhaust gas pressure variations ineffective to vary the fuel passage.

15. In apparatus for supplying and mixing charges for internal combustion engines, an exhaust manifold, an intake, means for conducting fuel to the intake, a valve therefor, a pressure responsive element for controlling said valve, a casing in which said pressure responsive element is disposed, and a pressure line between the exhaust manifold and the interior of said casing, said casing having a free space therein exteriorly of said pressure element approaching a minimum, whereby to increase the effectiveness of the pressure variations transmitted from the exhaust gas stream.

16. In apparatus for supplying and mixing charges for internal combustion engines, an intake, means for delivering fuel to the intake, and means for controlling the fuel flow in accordance with the load or speed conditions of engine operation, said means being responsive to intake depression to cause variation in fuel flow in inverse relation to the intake depression variations and being responsive to the variations in statical pressure of a medium varying with the charge weight to cause supplementary variation of the fuel flow in direct relation to the variations of said medium as the speed or load conditions vary.

17. In apparatus for supplying and mixing charges for internal combustion engines, an intake, a throttle, means for delivering fuel to the intake beyond the throttle, and means for controlling the fuel flow, one of said means being responsive to cause variation of fuel flow in inverse relation to and by the intake depression variations and another of said means being independently responsive to cause variation of fuel flow directly with and by the variations in statical pressure of a medium varying with the charge weight.

18. In apparatus for supplying and mixing charges for internal combustion engines, an intake, a thottle, means for conducting fuel to the intake beyond the throttle, gaseous injecting means acting on the discharge end of the fuel conducting means, and means for controlling the fuel flow in inverse relation to and by the intake depression variations at the higher depressions and directly with and by the variations in statical pressure of a medium varying substantially over the entire range of engine operation.

19. In apparatus for supplying and mixing charges for internal combustion engines, an intake, means for delivering fuel thereto, and a plurality of pressure responsive devices for controlling the fuel flow, one device operating substantially over the entire range of engine operation, and the other device operating to assist the first device principally at the fractional load portion of the range.

20. In apparatus for supplying and mixing charges for internal combustion engines, an intake, means for delivering fuel thereto, and a plurality of pressure responsive devices for controlling the fuel flow, one operated by intake depression variation principally at the fractional load portion of the range of engine operation and the other operated by the variations of a medium varying substantially over the entire range.

21. In apparatus for supplying and mixing charges for internal combustion engines, an intake, means for delivering fuel thereto, and means operated independently of each other for controlling the fuel flow by and in inverse relation to the variations in intake depression and by and in direct relation to the variations in the statical pressure of the exhaust gas.

22. In apparatus for supplying and mixing charges for internal combustion engines, an intake, means for conducting fuel thereto into the region of intake depression, and pressure responsive means for controlling the fuel flow operated by variations in the statical pressure of the exhaust gas substantially throughout the range of engine operation, and supplementary means for controlling the fuel flow operated by variation in intake depression at depression above a predetermined minimum.

23. In apparatus for supplying and mixing charges for internal combustion engines, an intake, a throttle therein, means for conducting fuel into the intake beyond the throttle, and pressure responsive means for controlling the fuel flow, said last named means being responsive to one medium for causing fuel variation substantially throughout the entire range of engine operation, and being responsive to another medium for supplementing the first named medium in causing fuel variation in like direction at higher intake depressions.

24. In apparatus for supplying and mixing charges for internal combustion engines, an intake, a throttle, means for delivering fuel to the intake beyond the throttle, means for introducing air into the fuel line, and a spring controlled pressure responsive device for controlling the air introduction.

25. In apparatus for supplying and mixing charges for internal combustion engines, an intake, a throttle, means for delivering fuel to the intake beyond the throttle, means for introducing air into the fuel line, and a spring controlled pressure responsive device actuated in response to variations in intake depression to increase the air opening as the intake depression increases, said device being adjusted to close the air opening during operation at relatively low depressions.

26. In apparatus for supplying and mixing charges for internal combustion engines, an intake, a throttle, means for delivering fuel to the intake beyond the throttle, means for introducing air into the fuel line, a pressure responsive device operated by the intake depression for controlling the air opening, and springs of unequal strength for causing closing movement of said device, the stronger spring becoming tensioned after the lighter one as the intake depression increases, and the lighter spring serving to prevent operation of the device when the intake depression is low.

27. In apparatus for supplying and mixing charges for internal combustion engines, an intake, a throttle, means for delivering fuel to the intake beyond the throttle, means for introducing air into the fuel line, a pressure responsive device operated by the intake depression for controlling the air opening to vary the fuel flow, and a device responsive to the pressure variations of another medium for further controlling the fuel.

28. In apparatus for supplying and mixing charges for internal combustion engines, an intake, means for delivering fuel thereto, a valve for controlling the fuel line, pressure responsive means for controlling the valve subject to the variations of a medium varying directly with the speed and load substantially throughout the range of engine operation, an air opening into the fuel line, and a pressure responsive device for varying the air opening at fractional loads substantially directly with the variations in intake depression.

29. In apparatus for supplying and mixing charges for internal combustion engines, an intake, means for delivering fuel into the intake, an air opening into the fuel line, a valve for controlling said line, means responsive to variations in intake depression for controlling said air opening, and means responsive to the variations in exhaust gas pressure for controlling said valve.

30. In apparatus for supplying and mixing charges for internal combustion engines, an intake, a throttle, means for conducting fuel to the intake beyond the throttle, means for discharging a fluid in inductive relation to the discharge end of the fuel line, means for introducing air into the fuel line, and a device actuated in response to pressure variations for increasing the air opening as the intake depression increases.

31. In apparatus for supplying and mixing charges for internal combustion engines, an intake, a throttle, means for conducting fuel to the intake beyond the throttle, means for discharging a fluid in inductive relation to the discharge end of the fuel line, means for introducing air into the fuel line, and a device actuated in response to variations in intake depression to increase the air opening as the intake depression increases, whereby to control the fuel flow at fractional loads, and means responsive to the variations of a medium effective in substantially a straight line direction substantially throughout the range of engine operation for controlling the opening of the fuel line.

32. In apparatus for supplying and mixing charges for internal combustion engines, an intake, means for conducting fuel into the intake, a valve operated by exhaust gas pressure for controlling the fuel passage area directly therewith, and means operated adjunctively with the control of the air supply at low fractional loads for mechanically moving said valve into position for idling.

33. In apparatus for supplying and mixing charges for internal combustion engines, an intake, means for conducting fuel into the intake, a valve therefor operated in response to variations in pressure differential increasing with the air supply, and means for mechanically moving said valve into idling position, said last named means serving to retain said valve in said position against movement due to the pressure variations.

34. The hereindescribed method of preparing charges for internal combustion engines which consists in introducing primary air at intake depressions corresponding to fractional load operation into the intake at the engine side of the throttle together with fuel introduced into the primary air through a metering orifice by the action of a variable pressure differential attenuated relative to the intake depression by the primary air introduction, and at a predetermined depression corresponding to a full load condition causing pressure conditions at a region of the intake passage divorced from the primary air flow to reduce the primary air to lessen the attenuation of pressure differential effective in producing fuel flow.

35. The hereindescribed method of preparing charges for internal combustion engines which consists in introducing at fractional load fuel into the intake at the engine side of the throttle through a variable metering orifice more constricted at higher depressions under a variable pressure differential attenuated relative to the intake depression corresponding to fractional load conditions, and when the intake depression approximates that for full load causing the pressure conditions at a region of the intake passage divorced from the primary air flow to reduce the attenuation in pressure differential on the fuel metering orifice.

36. The hereindescribed method of preparing charges for internal combustion engines which consists in introduction fuel through a metering orifice into the intake at the engine side of the throttle subject to the variable fuel flow inducing effects of intake depression substantially throughout the range of operation of the engine, attenuating said variable effects on the metering orifice at intake depressions in the intake corresponding to fractional load operation by primary air introduction into the fuel at the posterior side of the metering orifice, and in response to the unattenuated general pressure reduction in the intake divorced from primary air flow approximately corresponding to a condition representing transition into full load operation, reducing the extent of introduction of primary air to cause the pressure differential on the fuel orifice to approximate such general pressure reduction in the intake.

37. The hereindescribed method of preparing charges for internal combustion engines which consists in introducing primary air into the region of intake depression at the engine side of the throttle together with fuel introduced through a metering orifice into the primary air, the primary air being introduced in a quantity to reduce the variable pressure differential on the metering orifice due to intake depression sufficiently to allow the use of less constricted orifice areas at high depressions, and thereby reducing frictional effects therein, modulating the area of the fuel metering orifice in accordance with the conditions of engine operation, and in response to pressure reduction in an intake passage region divorced from primary air flow reducing the extent of introduction of the primary air when the general intake depression reduces in value to that for approximately full load operation to render more of the available depression effective in promoting fuel flow.

38. The method of supplying and mixing the components of the charge for internal combustion engines which consists in introducing primary air into the region of intake depression at the engine side of the throttle together with fuel introduced into the primary air through a metering orifice, subjecting the aerated fuel, as thus introduced, to the atomizing action of a high velocity gaseous stream supplementary to main air flow discharging into the intake, and reducing the extent of introduction of primary air in response to intake depression as full load conditions are approached.

39. The hereindescribed process of preparing charges for internal combustion engines which consists in blasting fuel by supplementary fluid injection into the main air stream in the region of intake depression, controlling the passage of fuel through a metering orifice, introducing air into the fuel line posterior to the metering orifice and coordinating the extent of introduction of air and the orifice areas to reduce the pressure differential on the orifice and frictional coefficients therein, and reducing the admission of air into the fuel line in response to the variations in intake depression substantially upon transition into full load operation.

40. The method of supplying and mixing the components of the charge mixture for an internal combustion engine which consists in introducing fuel through a metering orifice into the intake subject to the variable fuel flow inducing effects of intake depression and Venturi action, introducing at high depression primary air into the fuel line posterior to the metering orifice, and at low depression approximately corresponding to a full load condition, and in response to pressure reduction at a region of the intake passage divorced from primary air flow, reducing the extent of introduction of the primary air.

41. The method of supplying and mixing the components of the charge for internal combustion engines which consists in introducing fuel through a metering orifice varied in cross-section in accordance with conditions of engine operation into the intake subject to the variable fuel flow inducing effects of intake depression and Venturi action, at high depression introducing primary air into the fuel line posterior to the metering orifice to reduce the variable pressure differential on the orifice, and at low depression substantially corresponding to transition into full load operation closing off the primary air in response to pressure conditions in a region of the intake passage divorced from primary air flow.

42. In apparatus for supplying and mixing charges for internal combustion engines, an intake, a throttle therein, means including a metering orifice for delivering fuel into the intake at the engine side of the throttle, means for controlling the cross-sectional area of the metering orifice, and means for introducing primary air into the fuel line at the posterior side of the metering orifice, said last named means and said orifice controlling means being coordinated to maintain a variable pressure differential on the metering orifice attenuated relative to the intake depression and allowing use of larger orifice areas reducing frictional effects on fuel flow, and primary air introduction control means responsive 43. In apparatus for supplying and mixing charges for internal combustion engines, an intake, a throttle therein, means including a metering orifice for delivering fuel into the intake at the engine side of the throttle, means for varying the metering orifice area with conditions of engine operation, means for introducing primary air into the fuel line posterior to the metering orifice, pressure responsive means including a movable portion having a communication at one side with the intake at the engine side of the throttle independently of said fuel line, and vented at the opposite side to atmosphere, a valve actuated thereby and controlling the primary air introduction into the fuel line, said valve being retained opened at high intake depression corresponding to fractional load conditions and being biased to close at relatively low depression corresponding to full load conditions.

44. In apparatus for supplying and mixing charges for internal combustion engines, an intake, a throttle therein, means including a metering orifice for conducting fuel to the intake at the engine side of the throttle, means for automatically controlling the fuel metering orifice, means for introducing primary air into the fuel line at the posterior side of the metering orifice including provision responsive to intake depression for retaining said air introducing means open at high intake depression corresponding to fractional load conditions and for closing the same at relatively low intake depression corresponding to full load conditions, and a gas nozzle disposed in atomizing relation to the discharge end of the fuel line, and supplementing the primary air in facilitating fuel vaporization.

45. In apparatus for supplying and mixing charges for internal combustion engines, an intake, a throttle therein, a venturi in the intake at the engine side of the throttle, means including a metering orifice for delivering fuel into the venturi subject to the fuel flow inducing effects of intake depression and Venturi action, means for varying the cross-sectional area of the metering orifice, means for introducing primary air into the fuel delivering means at the posterior side of the metering orifice to reduce the pressure differential thereon and to allow the use of orifice areas of less constriction at high intake depression to reduce frictional coefficients therein, and primary air introduction control means responsive to intake pressure changes divorced from the controlled primary air, said last named means being retained open at fractional load operation and reduced in extent of opening at full load operation.

46. The method of preparing charges for internal combustion engines which consists in throttling the passage of air to the engine cylinders in accordance with the load conditions, introducing fuel into the air at the engine side of the air controlling means, modulating the passage of fuel at fractional load while introducing primary air into the fuel line at the posterior side of the modulated orifice to reduce the pressure differential thereon, and as full load conditions are approached reducing the admission of primary air in response to the reduced depression in a region of the intake conduit where the pressure is divorced from the controlled primary air flow.

47. The method of preparing charges for internal combustion engines which consists in introducing fuel into the intake at the engine side of the air controlling means subject to the fuel flow inducing action of intake depression and to a supplementary fuel flow inducing cause becoming relatively more effective as full load operation is approached, at fractional loads, modulating the fuel flow through a metering orifice while introducing primary air into the fuel line at the posterior side of the orifice to reduce the pressure differential thereon, and as full load operation is approached reducing the admission of primary air in response to the intake depression to render the intake depression and supplementary fuel flow inducing cause more effective in promoting fuel flow.

48. The method of preparing charges for internal combustion engines which consists in controlling the passage of air to the cylinders in accordance with the conditions of engine operation, introducing fuel into the air stream at the engine side of the air controlling means in response to variable pressure differential through a metering orifice modulated at fractional loads to keep the fuel flow within range while minimizing frictional effects productive of erratic fuel flow, the minimizing of frictional effects being effected by introducing primary air into the fuel line at the posterior side of the metering orifice to attenuate the variable pressure differential thereon, and as full load operation is approached reducing the admission of primary air in response to intake depression in an intake conduit region where the pressure is divorced from the primary air flow to render the intake depression more effective in causing fuel flow.

49. The method of preparing charges for internal combustion engines which consists in controlling the passage of air to the cylinders in accordance with the conditions of engine operation, introducing fuel through a metering orifice into the air stream at the engine side of the air controlling means subject to the fuel flow inducing action of intake depression and a supplementary fuel flow inducing cause, at fractional loads modulating the metering orifice to keep the fuel flow within range while minimizing frictional effects therein productive of erratic fuel flow, the minimizing of friction being effected by introducing primary air into the fuel line at the posterior side of the metering orifice to attenuate the variable pressure differential thereon, and as full load operation is approached reducing the admission of primary air in response to intake depression to render the fuel flow inducing forces more effective in promoting fuel flow.

50. In apparatus for supplying and mixing charges for internal combustion engines, an intake, a throttle therein, means in said intake at the engine side of the throttle for supplementing intake depression in promoting fuel flow, a fuel line having a metering orifice, and terminating in fuel flow inducing relation to said means, means for modulating said orifice, and means for introducing primary air into the fuel line at the posterior side of the metering orifice for reducing the variable pressure differential thereon, said modulating means and said air introducing means being coordinated to allow orifice areas minimizing frictional effects therein, and means responsive to intake depression for reducing the admission of primary air as full load conditions are approached, and retaining said primary air means open at fractional load operation.

51. In apparatus for supplying and mixing charges for internal combustion engines, an intake, a throttle therein, means for delivering fuel into the intake at the engine side of the throttle, means for modulaing said fuel delivery means, means for introducing primary air into the fuel delivery means for reducing the variable pressure differential on the fuel orifice modulated, said modulating means and said primary air means being coordinated to minimize frictional coefficients, and means movable in response to static changes in intake depression in a region of the intake passage where the pressure is divorced from the primary air flow and said means being thereby adjusted to reduce the extent of opening of the air introducing means as the intake depression approaches a value corresponding to transition from fractional to full load conditions of engine operation.

ARLINGTON MOORE.